(12) United States Patent
Kawakami et al.

(10) Patent No.: US 7,652,841 B2
(45) Date of Patent: Jan. 26, 2010

(54) SERVO CONTROLLING METHOD, RECORDING/REPRODUCING APPARATUS, MAGNETIC TAPE, AND MAGNETIC TAPE CARTRIDGE

(75) Inventors: Shinji Kawakami, Osaka (JP); Toshio Kawakita, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 0 days.

(21) Appl. No.: 12/026,391

(22) Filed: Feb. 5, 2008

(65) Prior Publication Data

US 2008/0278844 A1 Nov. 13, 2008

(30) Foreign Application Priority Data

Feb. 6, 2007 (JP) .............................. 2007-026402

(51) Int. Cl.
*G11B 5/584* (2006.01)
*G11B 21/02* (2006.01)
(52) U.S. Cl. ...................................... 360/77.12; 360/75
(58) Field of Classification Search ........................ None
See application file for complete search history.

(56) References Cited

U.S. PATENT DOCUMENTS 5,689,384 A 11/1997 Albrecht et al.
6,226,688 B1 5/2001 Frary
2007/0076316 A1* 4/2007 Kuse et al. ...................... 360/69
2008/0024905 A1* 1/2008 Johnson et al. ............ 360/77.12

FOREIGN PATENT DOCUMENTS

JP 8-30942 A 2/1996

* cited by examiner

*Primary Examiner*—Andrew L Sniezek
(74) *Attorney, Agent, or Firm*—Birch, Stewart, Kolasch & Birch, LLP (57) ABSTRACT

A servo controlling method of the present invention is a servo controlling method for controlling a position of a magnetic head against a magnetic tape that is accommodated in a cartridge and has at least a data track and a servo track, and the method includes the steps of: reading tape variance information from a magnetic tape cartridge (23) side, the magnetic tape cartridge (23) being composed of a cartridge (20) and a magnetic tape (21); reading a servo signal recorded in the servo track by the magnetic head and converting the servo signal into head position information; and controlling the position of the magnetic head according to an off-track value based on the tape variance information and an off-track value calculated from the head position information. With this configuration, even in the case where a recording track width is narrowed and a tape speed is increased, the magnetic head can follow a recording track accurately at a high speed.

4 Claims, 11 Drawing Sheets

SERVO CONTROLLING METHOD, RECORDING/REPRODUCING APPARATUS, MAGNETIC TAPE, AND MAGNETIC TAPE CARTRIDGE

BACKGROUND OF THE INVENTION

1. Field of the Invention

The present invention relates to a servo controlling method for head tracking that can be applicable to a data storage system for use in a computer using a magnetic tape. The present invention also relates to a recording/reproducing apparatus that is capable of executing the foregoing servo controlling method. Further, the invention relates to a magnetic tape in which various types of information for execution of the servo controlling method can be written, and relates to a magnetic tape cartridge. More specifically, the present invention relates to a data storage system for a computer that has excellent servo controlling properties.

2. Description of Related Art

The magnetic tapes can be used in various applications such as audio tapes, video tapes, computer tapes. In the field of tapes for data backup particularly, as the capacity of the hard disk whose contents are to be backed up increases, magnetic tapes having a recording capacity of 800 gigabytes or more per one reel is commercialized. Further, as the technique for backing up data of more than 4 terabytes is to be developed in the future, a large-capacity backup tape has been proposed.

To increase the capacity of a magnetic tape, for example, the following methods are available: a method of reducing the thickness of the magnetic tape so as to increase the tape length per one reel without increasing the reel diameter of the magnetic tape; a method of shortening the recording wavelength of data to be recorded in a magnetic tape so as to increase the recording density in the length direction of a magnetic tape; and, a method of narrowing the recording track width of a magnetic tape so as to increase the recording density in the width direction of the magnetic tape (recording density increasing technique).

As the recording track width is decreased by applying the magnetic tape recording density increasing technique, a magnetic head comes to fail to follow a recording track accurately owing to a position change in the width direction of the magnetic tape upon reproduction of data, which tends to result in an error. Then, presently dominant is a system in which a servo signal is recorded in a magnetic layer or a backcoating layer when a magnetic tape is manufactured and the servo control with use of the foregoing servo signal is carried out (a system using a servo mechanism).

As the servo method, the magnetic servo method and the optical servo method are available. The magnetic servo method is a method in which a servo signal are recorded magnetically in a magnetic layer of a magnetic tape and the servo tracking is carried out by magnetically reading the foregoing servo signal. The optical servo method is a method in which a servo signal composed of recess arrays are formed in a backcoating layer of a magnetic tape by laser irradiation or the like and the servo tracking is carried out by optically reading the recess array.

With such a servo method, when data are recorded in a magnetic tape or when data are reproduced from the magnetic tape, it is possible to enable a magnetic head to follow a recording track even if the position of the magnetic tape is varied relative to the magnetic head in the width direction. More specifically, a servo signal recorded in the magnetic tape is read by the servo head. Next, the position of a head unit (including at least a data-recording head and a data-reproducing head) in the width direction of the magnetic tape is controlled according to the servo signal thus read, so that the data-recording head or data-reproducing head is enabled to follow the recording track. This makes it possible to record information accurately in the magnetic tape, and to accurately reproduce information recorded in the magnetic tape.

As an example of the above-described servo method, the timing-based servo method is disclosed in Patent Document 1 (JP 8(1996)-30942 A) and Patent Document 2 (U.S. Pat. No. 6,226,688). In the timing-based servo method, a servo signal, in patterns tilted with respect to the width direction of the magnetic tape, are recorded in a magnetic tape. With reference to a time interval of peaks of a reproduction waveform obtained when the foregoing servo signal is reproduced, the head position is recognized.

However, the configuration disclosed in the Patent Documents 1 and 2 has the following problem: as the recording track width is narrowed with the increase in the recording density of the magnetic tape, an off-track value increases, which results in an increase in the time until the magnetic head is enabled to follow a recording track.

SUMMARY OF THE INVENTION

It is an object of the present invention to provide a servo controlling method, which enables a magnetic head to follow a recording track accurately at a high speed even in the case where a recording track width is narrowed and a tape speed is increased. It is another object of the present invention to provide a recording/reproducing apparatus to which such a servo controlling method is applied. Further, it is still another object of the present invention to provide a magnetic tape and a magnetic tape cartridge with which such a servo controlling method can be implemented.

The servo controlling method of the present invention is a servo controlling method for controlling a position of a magnetic head with respect to a magnetic tape that is accommodated in a cartridge and has at least a data track and a servo track, and the method-includes the steps of: reading tape variance information from a magnetic tape cartridge side, the magnetic tape cartridge being composed of the cartridge and the magnetic tape; reading a servo signal recorded in the servo track by the magnetic head and calculate relative position of the head against the magnetic tape; and controlling the position of the magnetic head according to an off-track value according to the tape variance information and an off-track value of the magnetic head calculated from the information of the position of the head.

The recording/reproducing apparatus of the present invention includes: a head unit including a data head capable of recording or reproducing data in or out of a magnetic tape, and a servo head capable of reproducing a servo signal recorded in the magnetic tape; a control part that detects a relative position of the head unit in a width direction with respect to the magnetic tape according to the servo signal reproduced by the servo head, and calculating an off-track value; and a driving part that enables the head unit to move in the width direction of the magnetic tape according to the off-track value calculated by the control part, wherein a magnetic tape cartridge that accommodates the magnetic tape and is provided with a memory is detachable/attachable with respect to the recording/reproducing apparatus; the control part reads tape variance information from the magnetic tape cartridge side; according to the tape variance information, the control part controls the driving part so that the driving part enables the head unit to move in a direction of approaching a target track position; and according to the off-track value, the control part controls the driving part so that the driving part enables the head unit to move in a direction of approaching a target track position.

Further, a magnetic tape of the present invention is a magnetic tape having a servo track, wherein tape variance information is recorded in either the servo track or a memory, or both of the same.

With the present invention, a magnetic head can follow a recording track accurately at a high speed even in the case where a recording track width is narrowed and a tape speed is increased as the recording density increases.

BRIEF DESCRIPTION OF THE DRAWINGS (a) of FIG. 1 is a plan view illustrating a configuration of a magnetic tape in which data are recorded by a head tracking servo method according to Embodiment 1. (b) of FIG. 1 is an enlarged plan view illustrating a configuration of a data band and servo bands. (c) of FIG. 1 is an enlarged plan view illustrating a configuration of a servo track in a servo band.

(a) of FIG. 3 is an enlarged plan view illustrating a configuration of a servo track in a servo band, and (b) of FIG. 3 is a waveform diagram of a servo signal.

DETAIL DESCRIPTION OF THE INVENTION

The servo controlling method of the present invention may be configured so that the magnetic tape cartridge further includes a memory in or out of which various types of information can be written or read, and the tape variance information is written in the memory.

The method may be configured so that the tape variance information is recorded in the servo track. With this configuration, even in the case where a magnetic tape cartridge is not equipped with a memory, tape variance information recorded in a servo track is read out and the magnetic head is moved, and thereafter the servo control with use of a servo signal can be carried out. Therefore, a motion value of the magnetic head upon the servo control according to the servo signal can be decreased, whereby the magnetic head can be shifted to an on-track state rapidly without failure.

Further, the method may be configured so that after the magnetic head is moved by the off-track value according to the tape variance information read out, the magnetic head is moved according to an off-track value calculated from the information of the head position extracted from the servo signal. By causing the magnetic head to operate in this way, the magnetic head preliminarily is moved according to the tape variance information in a direction of approaching to a target track position. Therefore, a motion value of the magnetic head upon the servo control based on the servo signal can be decreased, whereby the magnetic head can be shifted to an on-track state rapidly without failure.

Still further, the tape variance information may be recorded in the servo track.

Embodiment 1

[1. Data Recording Method]

First, the following describes a data recording method for recording data in a magnetic tape. The data recording method described in this section is a recording method in conformity with the LTO (linear tape open) standards. It should be noted that in the present specification, "cartridge" refers to a container that is capable of accommodating a magnetic tape and is in a state of not accommodating a magnetic tape. "Magnetic tape cartridge" refers to a cartridge in a state of accommodating a magnetic tape. Therefore, the magnetic tape cartridge is composed of a magnetic tape and a cartridge.

Figure 1:
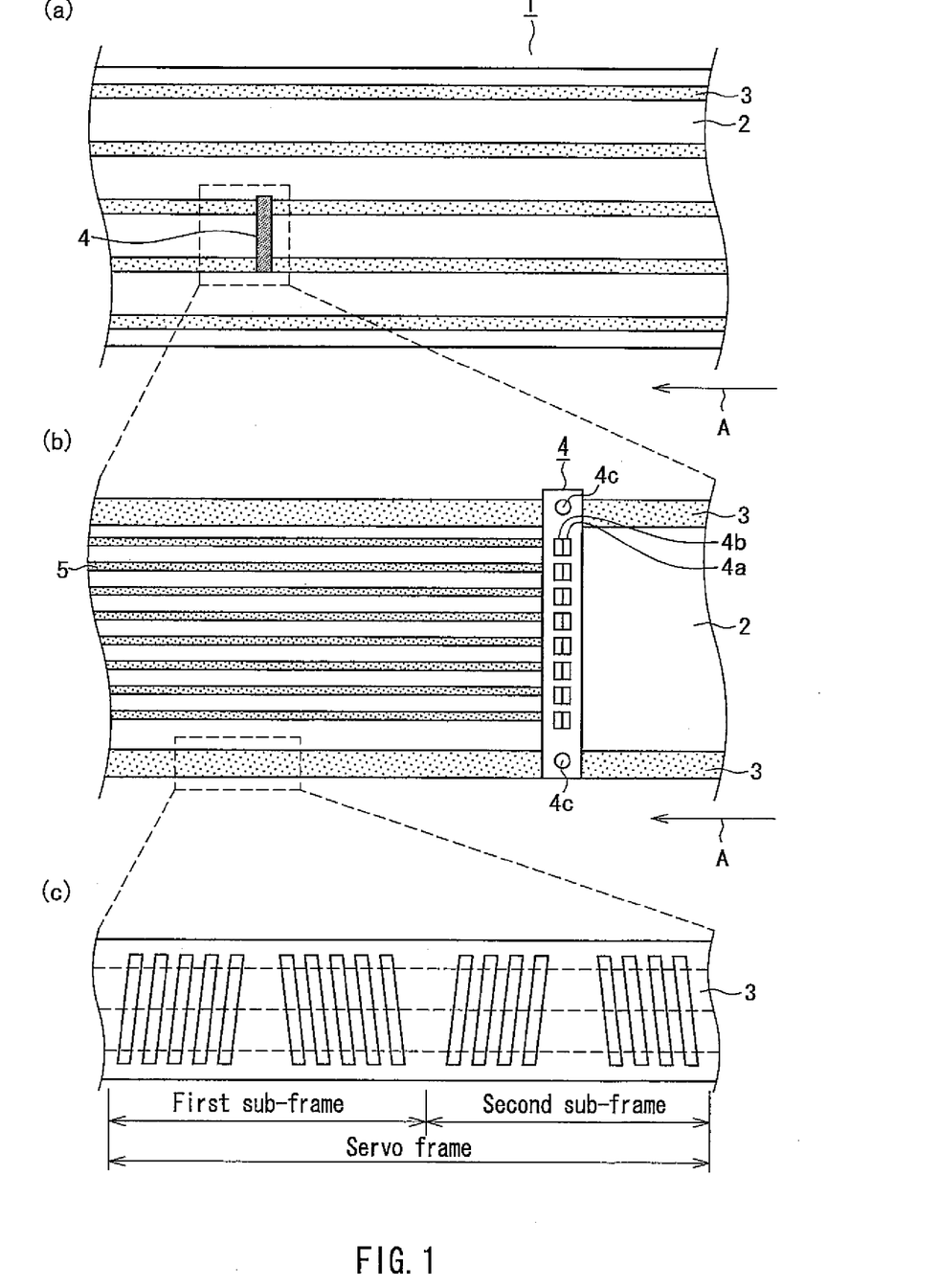

FIG. 1 is a schematic diagram illustrating a configuration of a recording surface of a magnetic tape. The magnetic tape shown in FIG. 1 is within the specifications in conformity with the LTO standards, and is accommodated in a cartridge in conformity with the LTO standards. (a) of FIG. 1 shows a configuration of a recording surface of a magnetic tape.

As shown in (a) of FIG. 1, a magnetic tape 1 is configured so that a magnetic layer is formed on a surface of a base film with an underlayer being interposed therebetween, and a backcoating layer is formed on a rear face of the base film. The magnetic tape 1 are provided with four data bands 2 and five servo bands 3 in the length direction of the magnetic tape 1. The data bands 2 and the servo bands 3 are arranged alternately in the width direction of the magnetic tape 1. The data bands 2 are formed on the magnetic layer of the magnetic tape 1, and digital data are recorded thereon. The servo bands 3 are formed on the magnetic layer or the backcoating layer of the magnetic tape 1, and a servo signal is recorded thereon.

(b) of FIG. 1 is a schematic diagram illustrating a configuration of a track, which is an enlarged view of a portion encircled with a broken line in (a) of FIG. 1. A magnetic head 4 has a width dimension such that the magnetic head 4 is capable of scanning one data band 2 and two servo bands 3 simultaneously as shown in (b) of FIG. 1. The magnetic head 4 includes eight sets of first and second heads 4a and 4b, and two servo heads 4c capable of reproducing a servo signal recorded in the servo bands 3; each of the eight sets is composed of one first head 4a and one second head 4b that are capable of recording or reproducing digital data, and the eight sets are arranged in the width direction of the magnetic tape 1. When the magnetic tape 1 moves in a direction indicated by an arrow A shown in the drawing, the first head 4a functions as a data-recording head capable of recording digital data in the data band 2, while the second head 4b functions as a data-reproducing head capable of reproducing digital data recorded in the data band 2. When the magnetic tape 1 runs in a direction reverse to the arrow A direction in the drawing, the second head 4*b* functions as a data-recording head, and the first head 4*a* functions as a data-reproducing head. It should be noted that the numbers of the first head 4*a*, the second head 4*b*, and the servo head 4*c* are mere examples.

(c) of FIG. 1 is a schematic view illustrating a configuration of the servo band, which is an enlarged view of a portion encircled with a broken line in (b) of FIG. 1. By causing the magnetic head 4, in a current-carrying state, to scan the data band 2 shown in (a) of FIG. 1, digital data can be recorded in the data band 2 by the first head 4*a* (or the second head 4*b*) included in the magnetic head 4. Besides, digital data recorded in the data band 2 can be reproduced by the second head 4*b* (or the first head 4*a*) included in the magnetic head 4. Further, the servo head 4*c* included in the magnetic head 4 is capable of reproducing a servo signal recorded in the servo bands 3. With use of the servo signal reproduced, the position of the magnetic tape 1 or the magnetic head 4 in the tape width direction can be detected.

Figure 2:
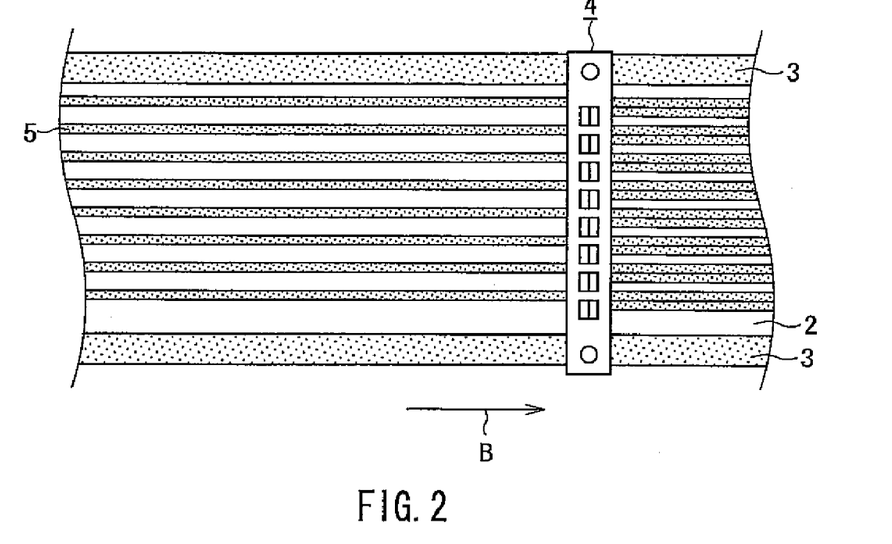
FIG. 2 is a plan view illustrating a configuration of a magnetic tape in which data are recorded by a head tracking servo method according to Embodiment 1.

Next, the following describes an operation carried out when digital data are recorded in the magnetic tape 1. As shown in (b) of FIG. 1, when digital data are recorded in the magnetic tape 1, the magnetic tape 1 is enabled to run in the arrow A direction, and current is carried through the first head 4*a*, whereby the eight data tracks 5 are formed at the same time in one data band 2. When digital data are recorded throughout one data band 2 from a leading end to a terminating end thereof, the magnetic head 4 slightly shifts the position thereof in the width direction of the magnetic tape 1 as shown in FIG. 2, the magnetic tape 1 is running in a direction indicated by an arrow B, and digital data are recorded by the second head 4*b* from the terminating end to the leading end of the data band 2. In other words, digital data are recorded while the magnetic tape 1 is running forward and backward. By repeating such reciprocating motions several times, digital data can be recorded at a high density in one data band 2. After digital data are recorded in one data band 2 while the magnetic tape 1 is running forward and backward for a predetermined number of times, another data band 2 is subjected to the same control as described above, whereby digital data can be recorded.

When digital data are recorded in the data band 2 or when digital data recorded in the data band 2 are reproduced, the position of the magnetic head 4 with respect to the data band 2 is controlled according to a servo signal read out of the servo bands 3 by the servo head. More specifically, an off-track value with respect to the target track position is calculated according to a servo signal read out of the servo band 3, and the position of the magnetic head 4 is moved in the tape width direction so that the foregoing off-track value is made null. With this, the magnetic head 4 can be enabled to follow the data band 2.

[2. Configuration of Servo Signal]

Figure 3:
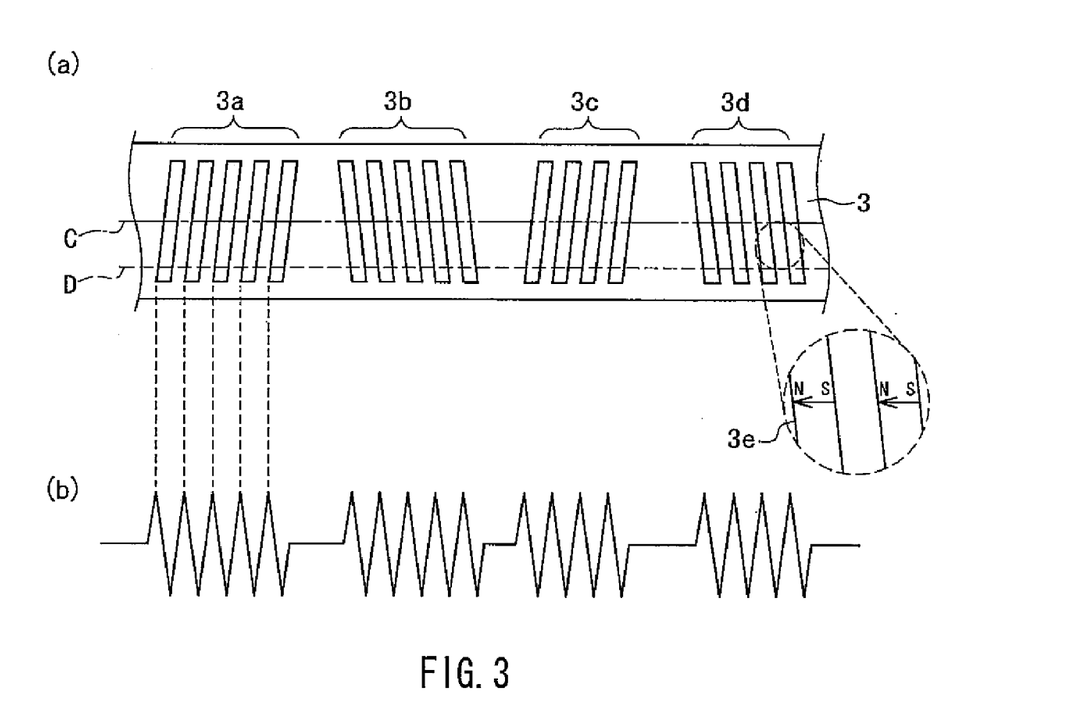

(a) of FIG. 3 is a schematic diagram showing a configuration of a servo track recorded in the servo band. (b) of FIG. 3 shows a waveform of a servo signal obtained when the servo track shown in (a) of FIG. 3 is reproduced. It should be noted that the servo track is formed by a servo writer.

As shown in (c) of FIG. 1, a servo track recorded in the servo band 3 is configured so that one servo frame is composed of a first sub-frame and a second sub-frame. Further, as shown in FIG. 3, the first sub-frame is composed of a first stripe group 3*a* and a second stripe group 3*b*. Still further, the second sub-frame is composed of a third stripe group 3*c* and a fourth stripe group 3*d*. The first stripe group 3*a* is composed of five stripes parallel with one another that are formed so as to tilt slightly with respect to the width direction of the servo band 3 (in the present embodiment, the azimuth angle is 6°±5°). The second stripe group 3*b* is composed of five stripes parallel with one another that are formed so as to tilt slightly with respect to the width direction of the servo band 3 (in the present embodiment, the azimuth angle is 6°±5°). It should be noted that the tilt directions of the first stripe group 3*a* and the second stripe group 3*b* are directions opposite to each other. The third stripe group 3*c* is composed of four stripes parallel with one another that tilt through the same angle in the same direction as the servo tracks of the first stripe group 3*a*. The fourth stripe group 3*d* is composed of four stripes parallel with one another that tilt through the same angle in the same direction as the stripes of the second stripe group 3*b*. In other words, the servo frame is composed of 18 stripes. All the stripe are magnetized in the same direction as indicated by arrows in an enlarged circle 3*e*. The enlarged circle 3*e* shows an enlarged view of a part of the stripes.

A servo signal as shown in (b) of FIG. 3 is obtained by causing a servo head to scan the servo tracks shown in (a) of FIG. 3. The servo signal shown in (b) of FIG. 3 has peak timings in synchronization with edges of the servo tracks at a reference line D shown in (a) of FIG. 3.

Next, the following describes the servo control.

As described above with reference to (b) of FIG. 1 and FIG. 2, when digital data are recorded in the data band 2, the magnetic head 4 is moved in the tape width direction while the magnetic tape 1 is enabled to run. Therefore, with this, the scanning position of the servo head 4*c* on the servo band 3 moves in the tape width direction. As shown in FIG. 3, the stripes recorded in the servo band 3 are substantially in the symmetric chevron shape, the space between the first stripe group 3*a* and the second stripe group 3*b* varies in the tape width direction (so does the space between the third stripe group 3*c* and the fourth stripe group 3*d*). When the stripes thus recorded are read by the servo head 4*c*, the magnetic tape 1 is transported at a constant speed in a length direction, and therefore the time required for the servo head 4*c* to pass over the space between the first stripe group 3*a* and the second stripe group 3*b* varies with the scanning position of the servo head 4*c* in the tape width direction. For example, in (a) of FIG. 3, the time required for the servo head 4*c* to pass over the space between the first stripe group 3*a* and the second stripe group 3*b* when the servo head 4*c* scans along a centerline C is shorter than the time required for the servo head 4*c* to pass over the space between the first stripe group 3*a* and the second stripe group 3*b* when the servo head 4*c* scans along the reference line D.

According to the time required for the servo head 4*c* to pass over the space between the first stripe group 3*a* and the second stripe group 3*b*, a distance W between adjacent stripe groups in the tape length direction can be calculated. Then, with the distance W, a distance X between the adjacent stripe groups on the centerline C shown in FIG. 3, and a tilt Y of the stripes, it is possible to calculate positions Z of the servo head 3 and the servo track with respect to the servo band centerline C according to Formula 1 given as:

$$Z=(X-W)/(2 \cdot \tan Y) \qquad \text{(Formula 1)}$$

According to the positions Z with respect to the servo band centerline C calculated as described above, the positions of data tracks that the first head 4*a* and the second head 4*b* currently scan are determined.

However, if the edges of the magnetic tape 1 wave or the like, the servo head deviates from a target servo track. As a result, the time required for the passing over the space between the first stripe group 3a and the second stripe group 3b varies. Based on this variance value, an off-track value is calculated by the above-described head position calculating method, and the position of the magnetic head 4 is controlled so as to make the off-track value null, whereby the normal on-track state of the magnetic head 4 can be achieved.

Figure 4A:
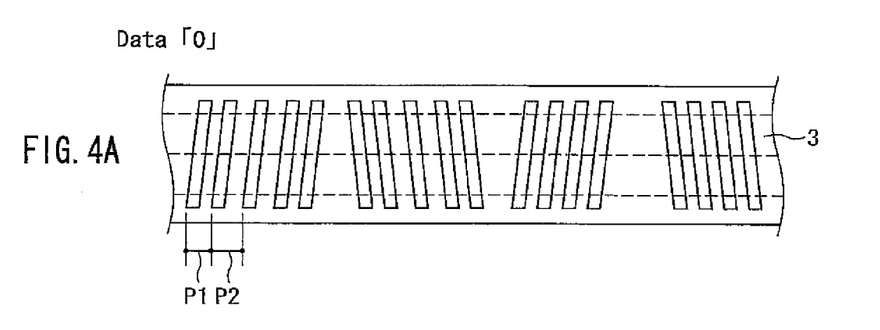
FIG. 4A is an enlarged plan view showing a configuration of a servo track in a servo band.
Figure 4B:
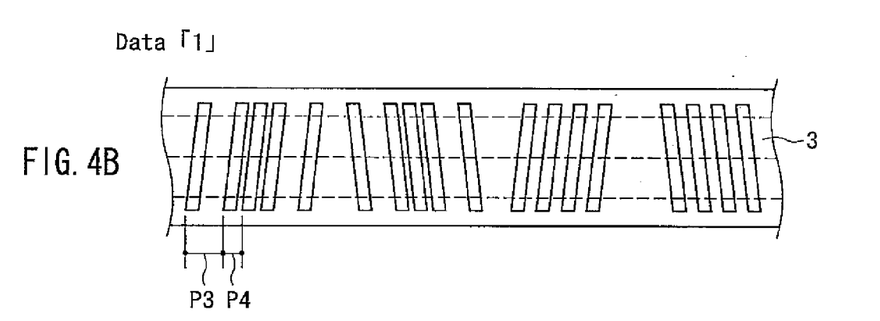
FIG. 4B is an enlarged plan view showing a configuration of a servo track in a servo band.

It should be noted that the servo tracks shown in FIG. 3 are configured so that stripes are formed at equal intervals, but stripes may be formed at intervals that are varied regularly as shown in FIGS. 4A and 4B so that information other than those for the servo control is included in the servo tracks. More specifically by forming stripes as shown in FIGS. 4A and 4B, a servo controlling operation can be executed, while various types of information relating to a magnetic tape, a cartridge, and a magnetic tape cartridge can be included therein. Since such information is composed of digital data, two patterns corresponding to values "0" and "1" have to be recorded in the servo tracks so that such information is recorded in the servo tracks.

FIG. 4A illustrates a configuration of stripes corresponding to the value "0". FIG. 4B illustrates a configuration of stripes corresponding to the value "1". In order to record the value "0" in the servo band 3, as shown in FIG. 4A, in recording the stripes of the first stripe group 3a and the second stripe group 3b, the interval (pitch P2) between the second and third stripes from the head of the stripe group in the tape running direction A, and the interval between the third and fourth stripes (the same interval as that of the pitch P2) are set wider as compared with the other intervals (pitch P1). In order to record the value "1" in the servo band 3, as shown in FIG. 4B, in recording the stripes of the first stripe group 3a and the second stripe group 3b, the interval (pitch P3) between the first and second stripes from the head of the stripe group in the tape running direction A, and the interval between the fourth and fifth stripes (the same interval as that of the pitch P3) are set wider as compared with the other intervals (pitch P4). By providing the regularity to the stripe intervals as shown in FIGS. 4A and 4B, the servo controlling operation can be executed, while various types of information composed of digital data can be contained in the servo track.

Figure 5:
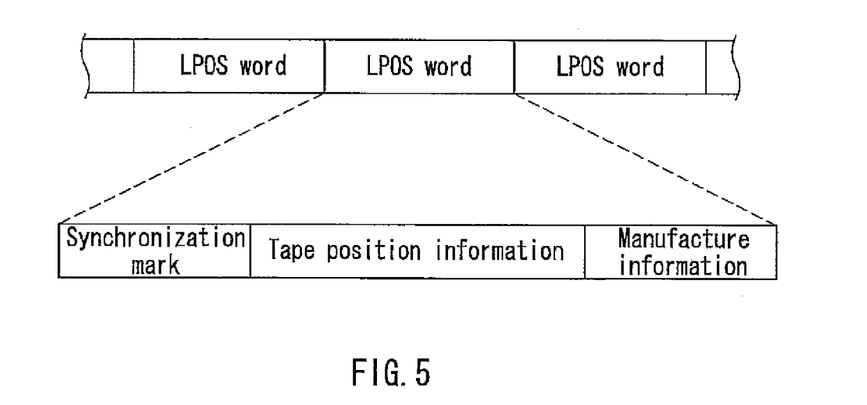
FIG. 5 is a schematic diagram showing a configuration of a LPOS word.

FIG. 5 illustrates a data structure of information recorded in the servo band 3. As shown in FIG. 5, the data structure is composed of a plurality of continuous LPOS words. One LPOS word is composed of a synchronization mark, tape position information, and manufacture information in a digital data form. The digital data are composed of binary data streams of 36 digits composed of "0" and "1", and each digit of the 36-digit binary data stream is composed of a servo frame shown in FIGS. 4A and 4B. Therefore, by forming the servo tracks according to the digital data of LPOS words as shown in FIGS. 4A and 4B, information can be contained in servo tracks.

[3. Configuration of Recording/Reproducing Apparatus]

Figure 6:
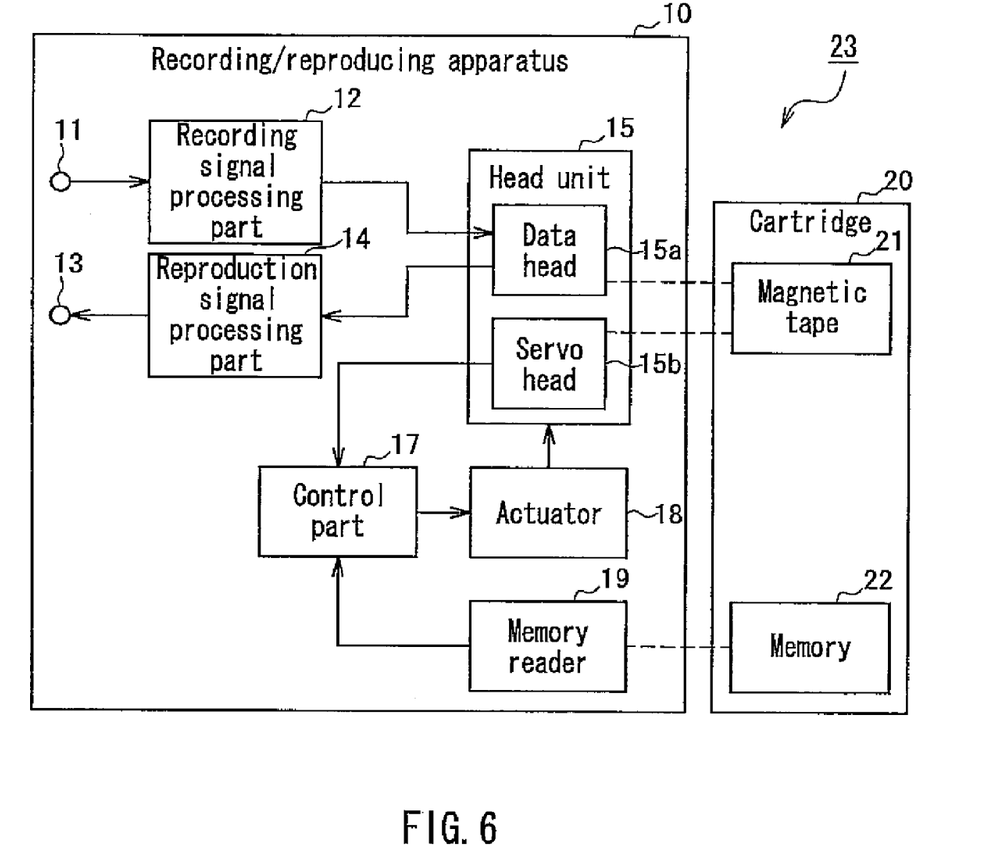
FIG. 6 is a block diagram showing a configuration of a recording/reproducing apparatus and the magnetic tape cartridge according to Embodiment 1.

FIG. 6 is a block diagram showing a configuration of a recording/reproducing apparatus in Embodiment 1. As shown in FIG. 6, the recording/reproducing apparatus 10 includes an input terminal 11, a recording signal processing part 12, an output terminal 13, a reproduction signal processing part 14, a head unit 15, a control part 17, an actuator 18, and a memory reader 19. Further, the recording/reproducing apparatus 10 is configured so that a magnetic tape cartridge 23 is detachable/attachable with respect to the recording/reproducing apparatus 10. The magnetic tape cartridge 23 is composed of a cartridge 20 provided with a magnetic tape 21 and a memory 22. The recording/reproducing apparatus 10 includes a mechanism for causing the magnetic tape 21 to run, a control circuit, etc., but illustrations and descriptions of the same are omitted.

The input terminal 11 is a terminal through which data to be recorded in the magnetic tape 21 are entered. The data entered through the input terminal 11 are composed of digital data.

The recording signal processing part 12 controls current in a data head 15a according to digital data entered through the input terminal 11.

The output terminal 13 is capable of outputting digital data fed from the reproduction signal processing part 14 to other circuits or the like.

The reproduction signal processing part 14 is capable of converting data (analog signals) reproduced from the magnetic tape 21 by the data head 15a into digital data.

The head unit 15 corresponds to the magnetic head 4 shown in FIG. 1, and includes the data head 15a and the servo head 15b. The head unit 15 is arranged so as to be movable in the width direction of the magnetic tape 21. The data head 15a includes a data-recording head and a data-reproducing head that are equivalent to the first head 4a and the second head 4b shown in FIG. 1, respectively, but they are referred to collectively as "data head" in conjunction with FIG. 6. The data-recording head is subjected to current control by the recording signal processing part 12, so as to be capable of recording data in the magnetic tape 21. The data-reproducing head is capable of reproducing data recorded in the magnetic tape 21. In the head unit 15, eight of the data heads 15a are arranged in the width direction of the magnetic tape 1, as described above with reference to (b) of FIG. 1 Further, the servo head 15b is capable of reproducing a servo signal by scanning servo tracks recorded in the servo band 3. Two of the servo heads 15b are provided so as to simultaneously scan the two servo bands 3 arranged with data bands being interposed therebetween, as described above with reference to (b) of FIG. 1.

The control part 17 detects a current position of the head unit 15 according to the servo signal reproduced by the servo head 15b. Further, the control part 17 calculates an off-track value based on the current position information of the head unit 15 and tape variance information fed from the memory reader 19 (described later), and generates a control signal for controlling an operation of the actuator 18 based on the off-track value. The control signal thus generated is a signal with which the position of the head unit 15 can be controlled, and at least information about a motion direction of the head unit 15 and information about a motion value of the same.

The actuator 18 is capable of displacing the head unit 15 in the width direction of the magnetic tape 1 according to a control signal fed from the control part 17.

The memory reader 19 communicates with the memory 22 built in the magnetic tape cartridge 23 so as to read information recorded in the memory 22. At least tape variance information among the information thus read is fed to the control part 17. In the present embodiment, the memory reader 19 communicates with the memory 22 in a noncontact manner. It should be noted that the memory reader 19 and the memory 22, which herein are configured to communication with each other in a noncontact manner, may be configured to communicate with each other in a contact manner, for example, magnetically, optically or electrically.

In the present embodiment, the magnetic tape cartridge 23 is composed of a magnetic tape cartridge in conformity with the LTO standards. The magnetic tape cartridge in conformity with the LTO standards incorporates one reel around which a magnetic tape is wound.

In the magnetic tape 21, digital data are recorded by the data head 15a. In the present embodiment, since the magnetic tape 21 is in conformity with the LTO standards, a magnetic tape having a width of about 12.65 mm is used.

The memory 22 is composed of a memory in which various types of information about the cartridge 20, the magnetic tape 21, and the magnetic tape cartridge 23 are written. The information written in the memory 22 is, for example, the format of the magnetic tape 21, the recording current (%), and the range of the magnetic tape 21 in which data are written. In addition to these, in the present embodiment, information about factors of variances of the magnetic tape 21 (tape variance information) is written.

In the case where tape variance information is written in the memory 22, tape variance information obtained by measurement in the slitting process, the pancake tester process, the process of the incorporation into the cartridge 20, the process of inspection using a drive, or the initialization process of the user's first use can be written in the memory 22. Further, in the case where the tape variance information is recorded in servo patterns, tape variance information determined by the slitting process or the pancake tester process can be written in servo patterns. It should be noted that in the case where the tape variance information is recorded in servo patterns, variance information at a specific tape position is written with a displacement in the tape running side, whereby the variance information can be read preliminarily when the variance information is to be reproduced. By so doing, the head position adjustment can be conducted immediately according to a tape variance.

The tape variance information includes LTM (lateral tape motion) information, tape waving shape information, and written-in error information. The LTM information includes time-based variance information and frequency-distribution-based information. Likewise, each of the tape waving shape information and the written-in error information also includes time-based variance information and frequency-distribution-based information. The time-based variance information of the LTM information is information indicative of position variance in the width direction of the magnetic tape 21 (this variance is referred to as "LTM"). The method for generation of the LTM information is as follows. While a magnetic tape is enabled to run, a laser light is projected to a width-direction edge from a front surface side of the magnetic tape, and a light-receiving element provided on a back surface side of the magnetic tape receives the laser light not blocked by the magnetic tape. Here, if the position of the magnetic tape varies in the width direction, an amount of light incident on the light-receiving element varies. Therefore, the amount of light incident on the light-receiving element is measured at predetermined time intervals, and a variance value of the magnetic tape 21 in the width direction is calculated according to the measured light amount. The result is indicated with a magnitude of the variance with respect to the frequency by the FFT (fast Fourier transformation) processing. By so doing, the frequency-distribution-based information of LTM is obtained.

The servo writer writes, in the memory 22, the variance value obtained as described above and the position information in the length direction of the magnetic tape 21 from which the variance information is obtained. The writing timing for the writing in the memory 22 is, for example, every 400 μsec. Further, the tape waving shape information is information indicative of static waving of the magnetic tape 21. The cause of the generation of the above-described LTM is the waving of the edges of the magnetic tape 21. The written-in error information is error information of a servo signal written in the magnetic tape, which is information obtained by measuring curves of the servo tracks and variances of servo signal pattern intervals.

[4. Operation of Recording/Reproducing Apparatus]

Figure 7A:
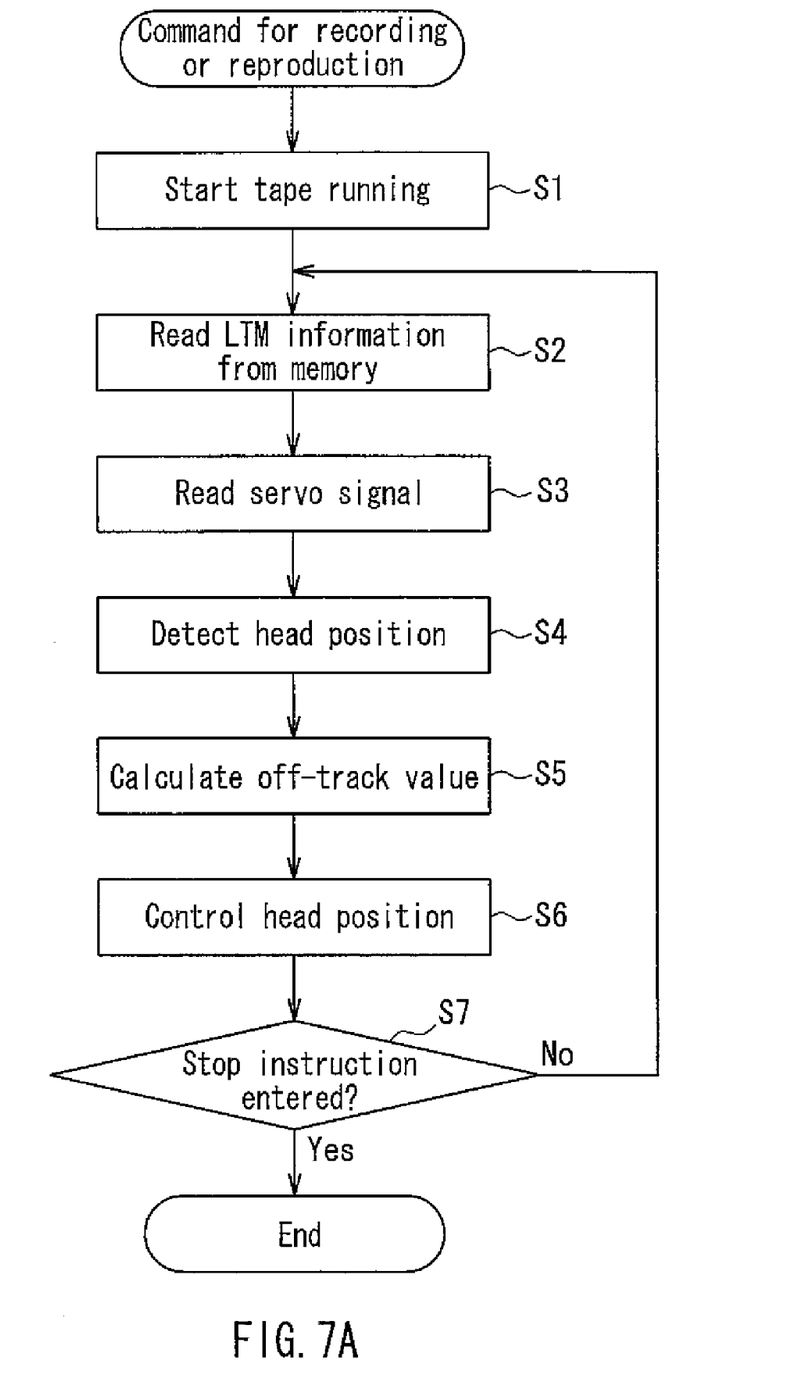
FIG. 7A is a flowchart showing a flow of the head tracking servo method according to Embodiment 1.

A servo controlling operation of the recording/reproducing apparatus is described with reference to FIGS. 6 and 7A. FIG. 7A is a flowchart showing a flow of an operation of the recording/reproducing apparatus. It should be noted that in the following description, it is assumed that the LTM information is written in the memory 22 preliminarily.

First, the magnetic tape cartridge 23 is loaded at a predetermined position in the recording/reproducing apparatus 10. When the magnetic tape cartridge 23 is loaded in the recording/reproducing apparatus 10, the memory reader 19 communicates with the memory 22, and obtains information about the magnetic tape cartridge 23 (format of the magnetic tape 21, etc.). Next, the magnetic tape 21 is loaded at a predetermined position in the recording/reproducing apparatus 10. Next, when the user operates an operating part (not shown in the drawings) in the recording/reproducing apparatus 10 to enter a recording command, the energizing of a motor for driving and rotating a reel table is started, whereby the reel is rotated. Thus, the running motion of the magnetic tape 21 is started (Step S1).

Next, the memory reader 19 communicates with the memory 22, and reads the LTM information stored in the memory 22 (Step S2). The LTM information read out of the memory 22 is entered in the control part 17. The control part 17 analyzes a motion of the magnetic tape 21 or distortion of a servo signal according to the LTM information. Further, the control part 17 reads a servo signal via the servo head 15b (Step S3). Next, the control part 17 analyzes the servo signal thus read out to detect a relative position of the magnetic tape 22 with respect to the magnetic head (Step S4). Based on the position information thus detected, the control part 17 calculates an off-track value (Step S5).

According to an off-track value thus calculated based on the LTM information stored in the memory 22, which is read out in the step S2, and the servo signal read out in the step S3, the control part 17 controls an operation of the actuator 18 so as to move the head unit 15 in the width direction of the magnetic tape 21 (Step S6).

Figure 7B:
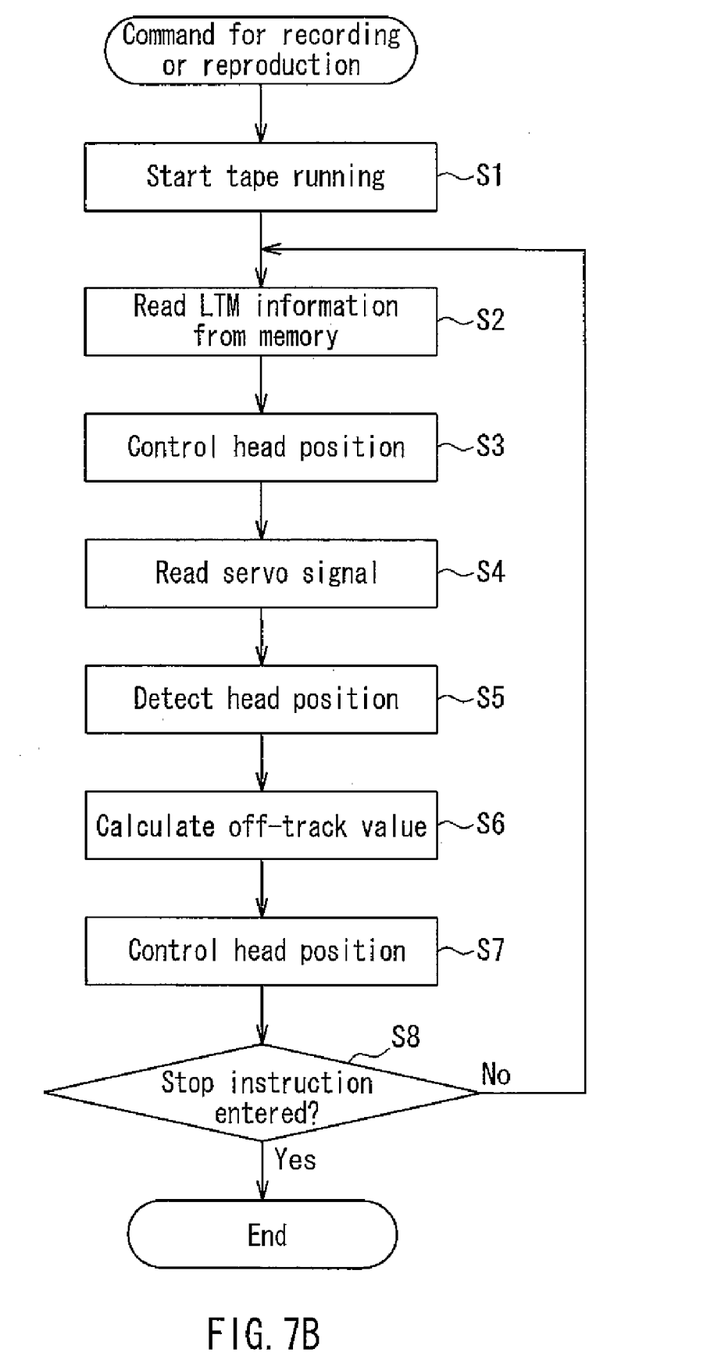
FIG. 7B is a flowchart showing another example of the head tracking servo method.

In the operation shown in FIG. 7A, the LTM information read out of the memory 22 and the servo signal, the position of the head unit 15 is controlled in one stage, but the control as shown in FIG. 7B also is feasible. FIG. 7B is the flowchart of FIG. 7A further including Step S3 in FIG. 7B. As shown in FIG. 7B, the following two-stage control is feasible: the control part 17 controls an operation of the actuator 18 according to the analysis result at Step S2 so as to move the head unit 15 to the width direction of the magnetic tape 21 (Step S3), and subsequently detects a relative position of the magnetic tape 22 with respect to the head unit 15 according to the analysis result at Step S4 (Step S5), and according to the detected position information, the control part 17 calculates an off-track value (Step S6).

This can enable the head unit 15 to move to a target track position on the magnetic tape 21 by the servo control. In this state, the recording signal processing part 12 can record digital data entered via the input terminal 11 in the data bands of the magnetic tape 21 via the data head 15a.

On the other hand, in the case where digital data recorded already in the magnetic tape 21 are reproduced, the processing operation of Steps S1 to S7 shown in FIG. 7A is executed, whereby the head unit 15 is moved to a position corresponding to a target track position on the magnetic tape 21. In this state, the reproduction signal processing part 14 converts a signal reproduced from the magnetic tape 21 by the data head 15a into digital data, and outputs the same via the output terminal 13. It should be noted that since the operation of the servo control upon reproduction is the same operation as the servo control upon recording, detailed descriptions of the same are omitted herein.

Next, the timing of the servo controlling operation is described.

Figure 8:
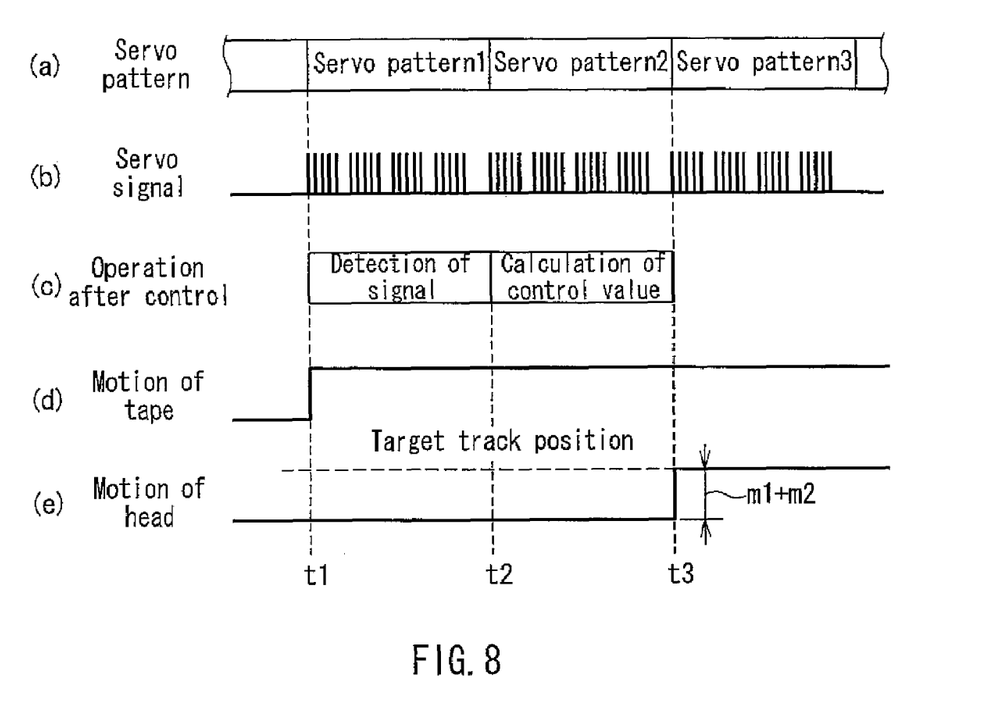
FIG. 8 is a timing chart showing a flow of the head tracking servo method according to Embodiment 1.

FIG. 8 is a timing chart showing an operation of the servo control according to the present embodiment. (a) of FIG. 8 shows servo patterns, and one servo pattern corresponds to one servo frame. (b) of FIG. 8 shows a servo signal. (c) of FIG. 8 shows contents of an operation by the control part 17. (d) of FIG. 8 shows a motion of the magnetic tape 21, and a High period is indicative of a period while the magnetic tape 21 is running. (e) of FIG. 8 shows a motion of the head unit 15 in the width direction of the magnetic tape 21.

In the head servo tracking, a current position of the magnetic head is detected according to the servo signal, and an off-track value as a difference between a target track position and the current position of the magnetic head is calculated. The magnetic head is moved so as to make the off-track value null, whereby the magnetic head is enabled to follow the track. The off-track value is composed substantially of LTM attributed to the tape, LTM attributed to the drive, written-in errors such as distortions in the servo signal on the tape, and an off-track value attributed to electrical noises. As shown in (d) of FIG. 8, when the running motion of the magnetic tape 21 at a timing t1, the control part 17 predicts an off-track value resulting from LTM at a timing t3 according to LTM information read out of the memory 22, and calculates a motion value m1 of the head unit 15. As shown in (c) of FIG. 8, the control part 17 reads a servo signal with use of the servo head 15b in a period from t1 to t2. Next, in a period from t2 to t3, the control part 17 calculates an off-track value by calculating a position of the head unit 15 in the period from t1 to t2. Then, the control part 17 calculates a motion value m2 of the head unit 15 according to the calculated off-track value. Next, the control part 17 moves the head unit 15 at the timing t3 according to the calculated motion value (m1+m2).

Figure 10:
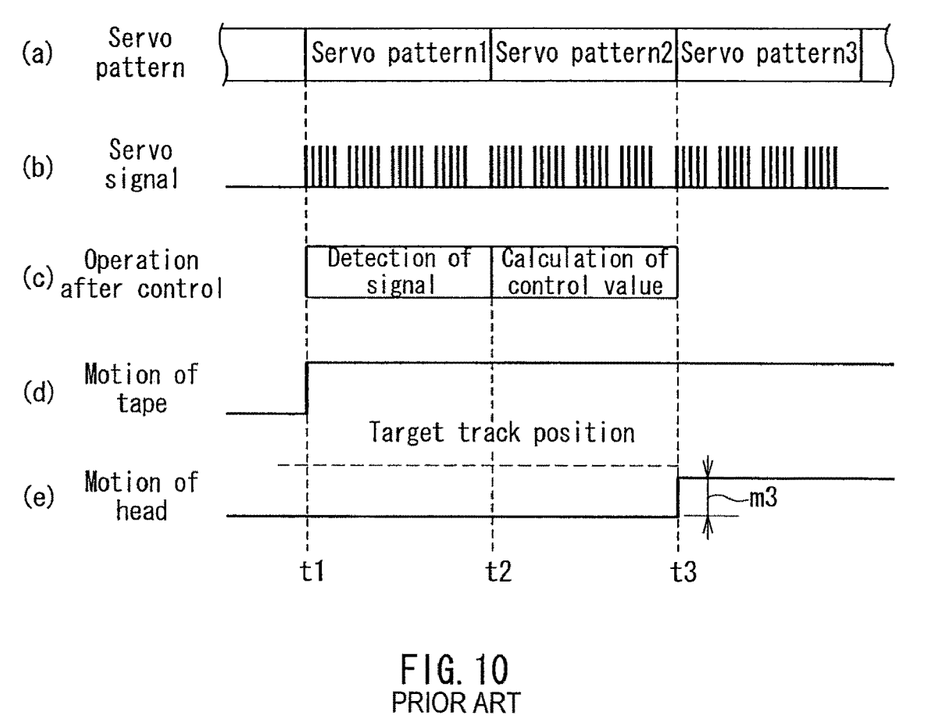
FIG. 10 is a timing chart showing a flow of a conventional head tracking servo method.

It should be noted in the configuration in which LTM information is not obtained from the memory 22, more time is required for causing the head unit 15 to follow the magnetic tape 21 by making the off-track value of the head unit 15 null. FIG. 10 shows a timing chart in the case where the servo control is carried out without the LTM information being obtained from the memory 22. (a) to (e) of FIG. 10 correspond to (a) to (e) of FIG. 8, respectively. As shown in FIG. 10, in the configuration in which LTM information is not obtained from the memory 22, even if the head unit 15 is moved so as to make an off-track value null, a position variance of the tape caused by the tape running motion makes it impossible to enable the head unit 15 to perform an accurate tracking operation.

In the present embodiment, based on the motion value m1 according to LTM information obtained from the memory 22 and the motion value m2 according to the servo signal, the head unit 15 can be enabled to move to a target track position instantly and accurately.

It should be noted that the controlling operation may be such that the off-track value is decreased by moving the magnetic head by a distance equivalent to the motion value m1 at the timing t1 and moving the magnetic head by a distance equivalent to the motion value m2 at the timing t3. Such a controlling operation also makes it possible to enable the magnetic head to arrive at a target track position within a short time at the timing t3.

[5. Writing of Tape Variance Information in Memory 22]

There are available three types of methods for writing tape variance information in the memory 22 as follows:

(1) a method of writing information in a process of inspection of a magnetic tape;

(2) a method of writing information by a user; and (3) a method of writing information in a slitting process, the pancake tester process, and the process of incorporation into the cartridge 20.

The method of writing tape variance information according to the above (1) is as follows: in a process of inspection of a magnetic tape, a magnetic tape incorporated in a cartridge is enabled to run and LTM of the magnetic tape is measured by using a drive (recording/reproducing apparatus) provided with a LTM measuring instrument, and the measurement result is written in the memory 22 as tape variance information. This method provides a measurement result with a relatively high accuracy, since LTM is measured by a drive, that is, LTM is measured in a state close to a state of actual use by a user.

The method of writing tape variance information according to the above (2) is as follows: when a user initializes or the like a magnetic tape with use of a drive equipped with a LTM measuring instrument, LTM is measured throughout the magnetic tape in the length direction by causing the magnetic tape to run from its leading end to its terminating end, and the measurement result is written in the memory 22 as tape variance information. This method provides a measurement result with the highest accuracy, since LTM is measured in a state of actual use by a user.

The method of writing tape variance information according to the above (3) is as follows: in the slitting process (the process of cutting a jumbo roll), LTM is measured by a slitting machine equipped with a LTM measuring instrument, and the measurement result is recorded in the servo band or the memory 22 in a servo writing process or a cartridge assembling process. The LTM measuring method in the pancake tester process is described below.

Figure 9:
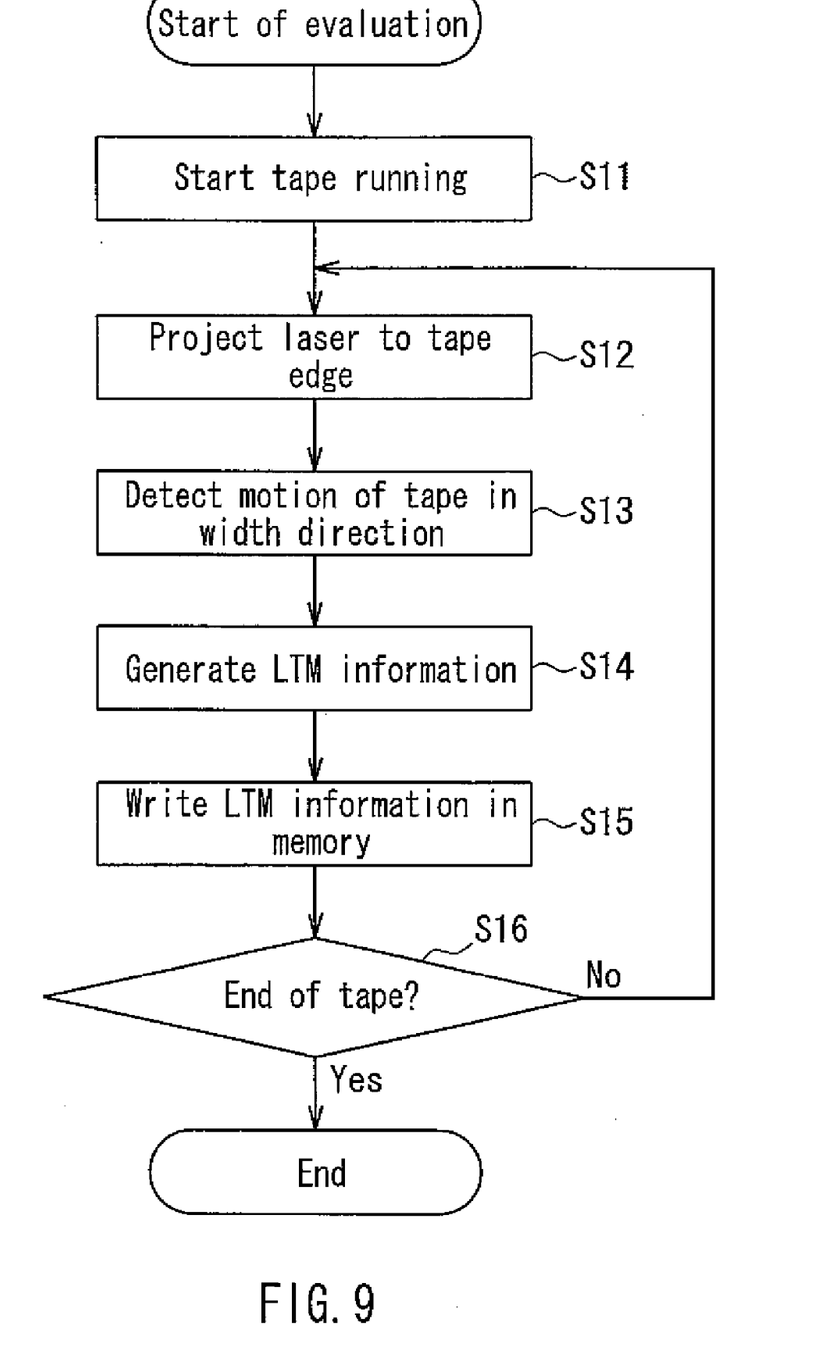
FIG. 9 is a flowchart showing a flow of an operation of writing LTM information by a pancake tester.

FIG. 9 shows a flow of a process of measuring LTM information with use of a pancake tester (LTM measuring instrument). A magnetic tape is enabled to run at a predetermined speed from a pancake loaded in a pancake tester (Step S11).

Next, a laser light is projected to a width-direction edge from a front surface side of the magnetic tape, and a light-receiving element provided on a back surface side of the magnetic tape receives the laser light (Step S12).

Next, according to the light received by the light-receiving element, a motion of the magnetic tape in the width direction is detected. More specifically, since a laser element for projecting the laser light is arranged at a position such that an edge of the magnetic tape in a state in which the magnetic tape is at a normal position passes through the center of a light spot of the laser light (that is, in a state in which the magnetic tape blocks about half of the light spot of the laser light), the value of light received by the light-receiving element increases/decreases as the magnetic tape has variances in the width direction. When the value of light received increases/decreases, a level of an electric signal obtained by photoelectric conversion by the light-receiving element increases/decreases. According to the value of the electric signal, the variance value of the magnetic tape can be detected, and according to an increase/decrease in the electric signal, the variance direction of the magnetic tape can be detected. Thus, the motion (variance value and variance direction) of the magnetic tape can be detected (Step S13).

Next, according to the motion of the magnetic tape detected at Step S13, LTM information is generated. More specifically, data of the position information on the magnetic tape, whose motion is detected at Step S13, the variance value of the magnetic tape, and the variance direction of the magnetic tape are stored (Step S14).

Next, the LTM information generated at Step S14 is written in the memory 22 (Step S15).

[6. Effect of Embodiment, etc.]

According to the present embodiment, when the servo control is performed, tape variance information is read out of the memory 22, a servo signal recorded in the servo track is read by the magnetic head 4 so that information of a relative head position with respect to the magnetic tape 1 is extracted, and the position control of the magnetic head 4 is carried out according to an off-track value based on the tape variance information and an off-track value of the magnetic head 4 calculated from the head position information. Therefore, the magnetic head 4 can be enabled to follow a recording track accurately at a high speed. Accordingly, even in the case where a recording track width is narrowed and a tape speed is increased as the recording density increases, the magnetic head 4 can be enabled to follow a recording track accurately at a high speed, and data can be recorded/reproduced without occurrence of errors.

Further, when the servo control is performed, tape variance information is obtained from the memory 22, a motion of the magnetic tape in the width direction is predicted preliminarily according to the tape variance information thus obtained, whereby an off-track value is estimated, and a motion value of the magnetic head that is calculated according to the estimated off-track value due to the motion of the magnetic tape in the width direction is added to a control value of the magnetic head upon the servo control. By so doing, the magnetic head can be enabled to follow a recording track accurately at a high speed. Therefore, even in the case where a recording track width is narrowed and a tape speed is increased as the recording density increases, the magnetic head can be enabled to follow a recording track accurately at a high speed, and data can be recorded/reproduced without occurrence of errors.

More specifically, conventionally, in the method shown in (e) of FIG. 10, an operation for controlling the tracking operation of the magnetic head is carried out on the basis of only an off-track value calculated from a head position detected according to a servo signal read out by the magnetic head 4 at the timing t3. However, this method is not capable of responding to an off-track value due to a motion of the magnetic tape in the width direction after the servo signal is detected. Therefore, the accuracy in causing the magnetic head to follow a recording track is inferior, and more time is required for decreasing the off-track value. In contrast, in the present embodiment shown in FIG. 8, LTM information attributed to the tape, tape edge waving shape information, information about written-in errors, etc. are obtained from the memory 22, and an off-track value resulting from these is estimated preliminarily. By adding the off-track value to a control value upon the servo control, the magnetic head is moved.

It should be noted that in Embodiment 1, the tape variance information is stored in the memory 22, but the tape variance information may be contained in the servo track of the magnetic tape 21. More specifically, this configuration can be implemented by containing digital data corresponding to the tape variance information in LPOS word shown in FIG. 5. When the servo control is performed with respect to a magnetic tape that has tape variance information recorded in its servo track, first, the tape variance information recorded in the servo track is read out, and then, the servo control is carried out according to an off-track value based on the foregoing tape variance information and an off-track value calculated according to head position information detected according to the servo signal. With such an operation, the operation control equivalent to that of the above-described configuration in which the servo control is carried out by reading LTM information from the memory can be carried out. Further, even a magnetic tape cartridge to which no memory is provided is capable of causing a magnetic head to follow a track in an on-track state accurately at a high speed in the same manner as a magnetic tape cartridge provided with a memory.

Embodiment 2

The present embodiment shows an example in which LTM frequency information obtained by subjecting LTM information (tape variance information) to frequency conversion by the FFT processing is recorded in a memory provided on a magnetic tape cartridge. It should be noted that even if LTM frequency information is contained in a servo signal recorded in a magnetic tape, the head tracking servo method of the present embodiment functions sufficiently.

Figure 11:
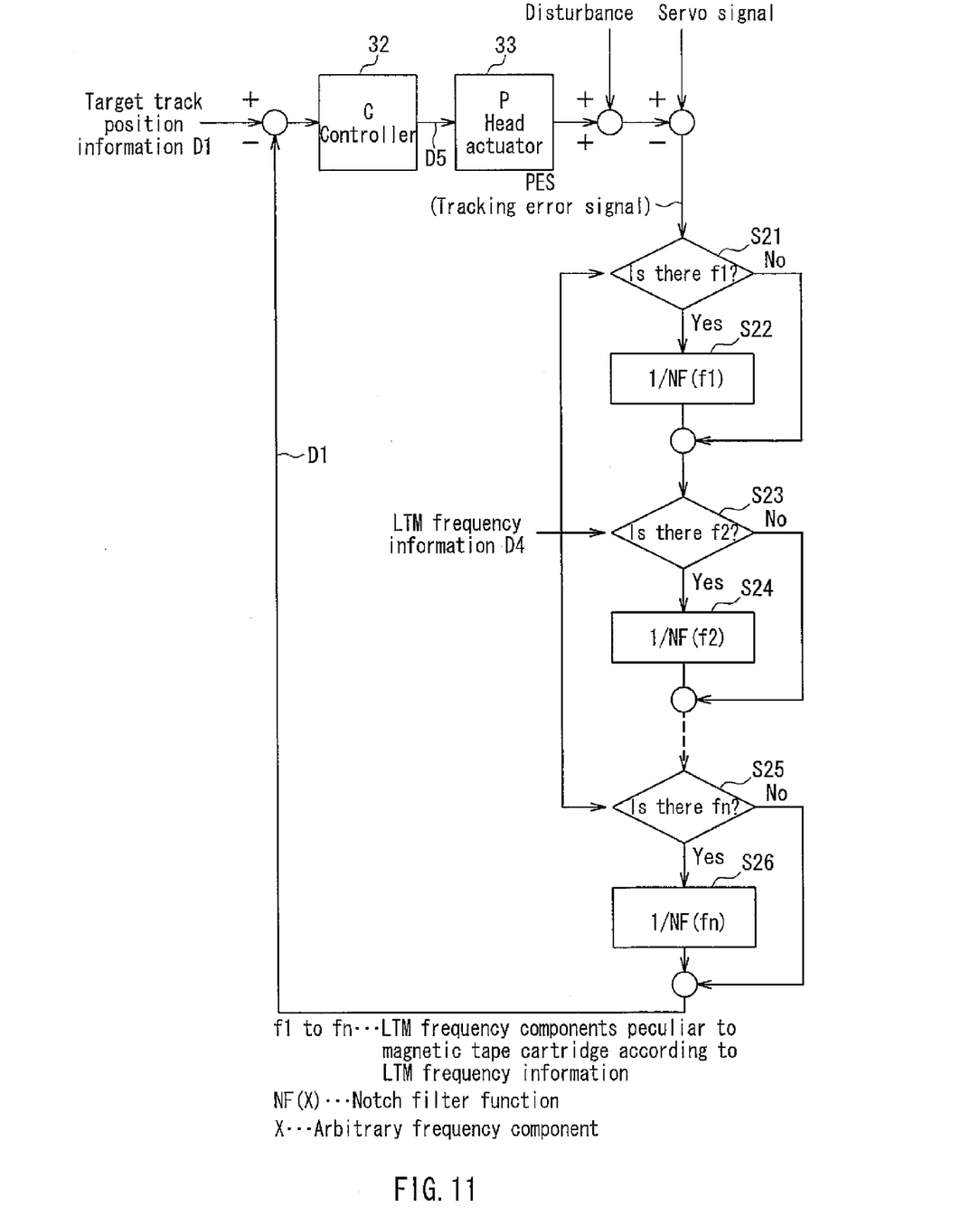
FIG. 11 is a block diagram illustrating a control algorithm of a controller according to Embodiment 2.

FIG. 11 is a control algorithm according to the present embodiment. The control algorithm according to the present embodiment is described with reference to FIG. 11. Ahead actuator 33 moves the head unit 15 (see FIG. 6) in the width direction of the magnetic tape according to control data D5 generated by a controller 32. "f1" to "fn" shown in FIG. 11 are LTM frequency components peculiar to a magnetic tape cartridge according to LTM frequency information D4 read out of the memory provided on the magnetic tape cartridge. With respect to the LTM frequency information D4 as indicated above, as shown in Steps S21 to S26, reciprocals of the same are obtained by a notch filter function (NF) in the vicinities of the frequency bands of the LTM frequency components f1 to fn ("n" is an integer not less than 1), and by so doing, negative feedback values of position variances of the magnetic tape in the vicinities of the frequency bands of the LTM frequency components f1 to fn ("n" is an integer not less than 1) are increased, whereby the tracking operation of the magnetic head is enabled. Tracking error signals are fed to a controller 32 again, and the magnetic head tracking control based on frequency information is carried out in the same manner as described above. This makes it possible to improve the control performance corresponding to the LTM frequency peculiar to the magnetic tape cartridge.

Figure 12:
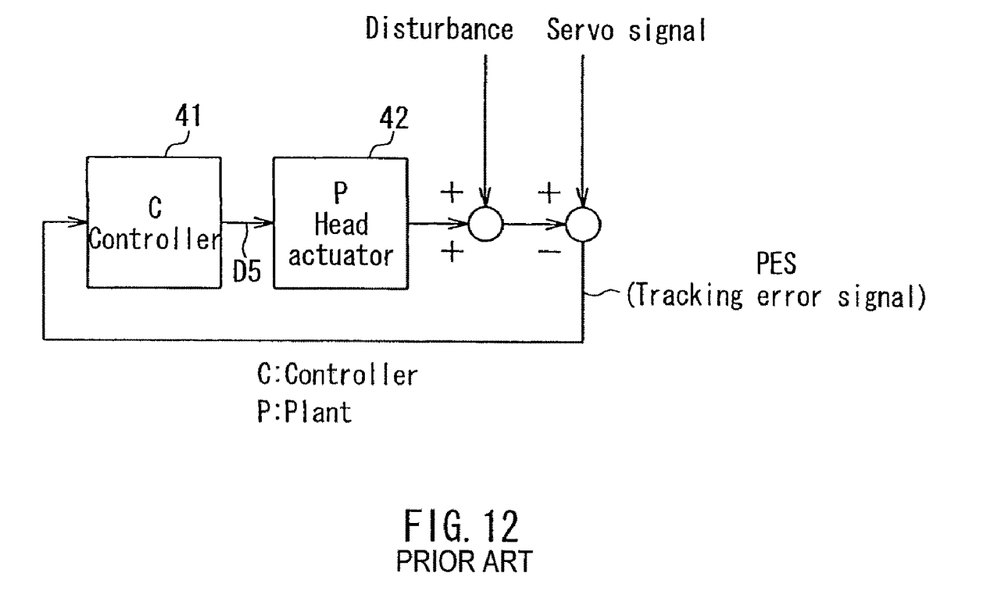
FIG. 12 is a block diagram illustrating a control algorithm of a conventional controller.

It should be noted that FIG. 12 shows a control algorithm of a conventional controller. As shown in FIG. 12, with a usual controller according to the conventional control algorithm, an improvement in the tracking property of the magnetic head in a low frequency range leads to amplification of disturbance components in a high frequency range, which results in deterioration of the magnetic head tracking property in the high frequency range. Therefore, it is difficult to improve a tracking property of a magnetic head with respect to a magnetic tape at every frequency from a low range to a high range.

In the present embodiment, by improving the performance of the tracking operation of a magnetic head with respect to a magnetic tape at a frequency corresponding to a LTM frequency peculiar to a magnetic tape cartridge, the magnetic head can be enabled to track the magnetic tape accurately, even if an error of a servo signal occurs, such as a curve of a servo track recorded in the magnetic tape, variances of servo signal pattern intervals, etc.

The servo control method of the present invention is useful in a data storage system for use in a computer in which a magnetic tape is used as an information medium.

What is claimed is:

1. A head tracking servo method for controlling a position of a magnetic head with respect to a magnetic tape that is accommodated in a cartridge and has at least a data track and a servo track, the method comprising the steps of:

reading tape variance information from a memory in a magnetic tape cartridge, the magnetic tape cartridge including the cartridge, the magnetic tape, and the memory;

reading a servo signal recorded in the servo track by the magnetic head and calculate a relative position of the head against the magnetic tape; and controlling the position of the magnetic head according to an off-track value based on the tape variance information and an off-track value of the magnetic head calculated from the information of the position of the head.

2. The head tracking servo method according to claim 1, wherein the tape variance information recorded in the memory is read, so that a first off-track value is calculated, the servo signal recorded in the servo track is read by the magnetic head, and information of a relative position of the head against the magnetic tape is extracted, so that a second off-track value is calculated, a first motion value of the magnetic head is calculated from the first off-track value, and the magnetic head is moved in a width direction of the magnetic tape based on the calculated first motion value, and a second motion value of the magnetic head is calculated from the second off-track value, and the magnetic head is moved in the width direction of the magnetic tape based on the calculated second motion value.

3. A recording/reproducing apparatus comprising:

a head unit including a data head capable of recording or reproducing data in or out of a magnetic tape, and a servo head capable of reproducing a servo signal recorded in the magnetic tape;

a control part that detects a relative position of the head unit in a width direction against the magnetic tape according to the servo signal reproduced by the servo head, and calculating an off-track value; and a driving part that enables the head unit to move in the width direction of the magnetic tape according to the off-track value calculated by the control part, wherein a magnetic tape cartridge that accommodates the magnetic tape and is provided with a memory storing tape variance information can be taken in and out from the recording/reproducing apparatus, the tape variance information being information about a variance value of a position of the magnetic tape in the width direction, the control part reads the tape variance information from the memory, according to the tape variance information, the control part controls the driving part so that the driving part enables the head unit to move in a direction of approaching a target track position, and according to the off-track value, the control part controls the driving part so that the driving part enables the head unit to move in a direction of approaching a target track position.

4. The recording/reproducing apparatus according to claim 3, wherein the tape variance information recorded in the memory is read, so that a first off-track value is calculated, the servo signal recorded in the magnetic tape is read by the servo head, and information of a relative position of the head against the magnetic tape is extracted, so that a second off-track value is calculated, a first motion value of the magnetic head is calculated from the first off-track value, and the driving part is controlled so that the magnetic head is moved in the width direction of the magnetic tape based on the calculated first motion value, and the driving part is controlled so that a second motion value of the magnetic head is calculated from the second off-track value, and the magnetic head is moved in the width direction of the magnetic tape based on the calculated second motion value.

* * * * *